DEVICE FOR REPRODUCING RECORDED SOUNDS IN TOYS

Original Filed Nov. 17, 1966 3 Sheets-Sheet 1

JOHN W. RYAN
RICHARD SHIH-TENG CHANG

BY Seymour A. Scholnick
ATTORNEY

DEVICE FOR REPRODUCING RECORDED SOUNDS IN TOYS

Original Filed Nov. 17, 1966

INVENTORS
JOHN W. RYAN
RICHARD SHIH-TENG CHANG

BY Seymour A. Scholnick
ATTORNEY

DEVICE FOR REPRODUCING RECORDED SOUNDS IN TOYS

Original Filed Nov. 17, 1966

INVENTORS
JOHN W. RYAN
RICHARD SHIN-TENG CHANG
BY Seymour A. Scholnick
ATTORNEY

United States Patent Office 3,515,390

Patented June 2, 1970

3,515,390
DEVICE FOR REPRODUCING RECORDED SOUNDS IN TOYS

John W. Ryan, Los Angeles, and Richard Shih-Teng Chang, Gardena, Calif., assignors to Mattel, Inc., Hawthorne, Calif., a corporation of California Original application Nov. 17, 1966, Ser. No. 595,132. Divided and this application May 21, 1968, Ser. No. 730,890

Int. Cl. G11b *25/06*

U.S. Cl. 274—1 3 Claims

ABSTRACT OF THE DISCLOSURE

A constant tension spring motor arranged to advance, from one drum to another, a tape having a plurality of groove sound tracks, a needle and speaker reproduces the sound from one of the tracks when the tape advances in one direction but is free of the tape when it is returned in the other direction. A drawstring is used to wind the motor and return the tape in the other direction and tension in the drawstring also acts to retract the tape from contact with the needle.

Cross reference to related application

This application is a division of our copending application, Ser. No. 595,132, filed Nov. 17, 1966.

The present invention relates to a device for reproducing recorded sounds in toys and more particularly to a compact, durable sound producing means in combination with a toy for reproducing recorded sounds which are characteristic of the toy.

Many prior art devices for reproducing recorded sounds in toys are known. In one such device, a plurality of discrete sounds are recorded on a disc-type phonograph record forming a part of a phonograph device which may be mounted inside a toy. While generally satisfactory, this type of sound producing means has the disadvantage that the diameter of the phonograph record becomes impractical for small toys, such as small dolls and stuffed figure toys and the like, when more than a small number of recorded messages are provided on the phonograph record.

Accordingly, it is a primary object of the present invention to provide a compact, durable sound producing means in combination with a toy for producing sounds characteristic of the toy.

Another object of the present invention is to provide a device of the type described which includes a flexible, elongated, recorded-message carrier means operatively associated with a power drum means and a take-up drum means in such a manner that the carrier means may be wound from one of said drum means to the other of said drum means during operation of the device by a constant-force spring means of the present invention.

A further object of the present invention is to provide a new and useful device for reproducing recorded sounds in toys wherein a recorded-message carrier is integral with a spring means employed to furnish driving power for the device.

According to the present invention, a new and useful compact, durable sound producing means is mounted in a doll for producing sounds characteristic of the doll. The device includes a power drum means rotatably mounted in the doll, take-up drum means rotatably mounted in the doll closely adjacent the power drum means, spring means normally biased to wind itself on the take-up drum means and having an end operatively associated with the power drum means. Means are operatively associated with the power drum means for winding the spring means thereon to store the energy and a flexible, elongated recorded-message carrier means is operatively associated with the second take-up drum means. The carrier means is normally wound on one of the drum means and is transferred to the other drum means during the winding of the spring means onto the power drum means for storing said energy. The carrier means is then returned to said one drum means during the return of the spring means. Recorded sounds characteristic of the doll are provided on the message-carrier means and sound reproducing means are operatively associated with the carrier means for reproducing the recorded sounds.

Governor means are provided in operative association with one of the drum means for controlling the rate that the recorded-message carrier means is returned to said one drum means. In a first embodiment of the invention, the recorded-message carrier means is provided in the form of an elongated, plastic tape upon which messages are recorded. This tape is wound on the power drum means normally and is transferred to the take-up drum means during winding of the power drum to transfer the spring means thereto. When the power drum is then released, the energy stored in the spring means will rotate the power drum and return the tape to the take-up drum.

The sound reproducing means includes a phonograph needle which is placed in the path of travel of the tape as it is returned to the take-up drum means. A plurality of different messages may be recorded on the tape in parallel, spaced-apart grooves and the needle may be shifted from one groove to another by a lever means connected thereto.

In the second embodiment of the present invention, the recorded-message carrier means is formed integrally with the spring means and may comprise a plastic coating bonded thereto. In this embodiment, a plurality of different messages are recorded on the carrier means in parallel grooves and a means of random selection of grooves is effected by turning the beginning and ending of each groove outwardly to one edge of the carrier means. When the carrier means is started, the groove engaged by the needle depends on the instant the needle makes contact with the carrier means.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

Figure 1:
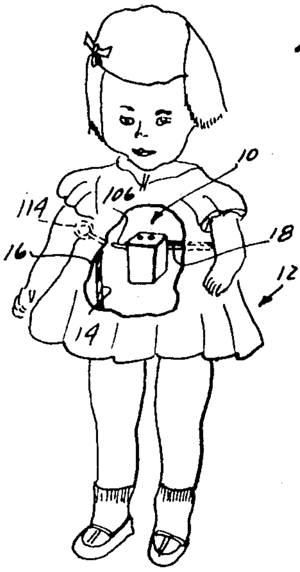
FIG. 1 is a perspective view of a sound producing means of the present invention in combination with a doll for producing sounds characteristic of the doll.

Referring again to the drawings and more particularly to FIGS. 1–7, a sound producing means constituting a first embodiment of the present invention, generally designated 10, is shown in combination with a toy 12 which is shown herein for purpose of illustration, but not of limitation, as comprising a doll having a torso 14 including an encompassing side wall 16. The sound producing means 10 is mounted inside the torso 14 and is secured thereto by a bracket 18 connecting the sound producing means 10 to the side wall 16.

The sound producing means 10 includes a housing 20 having opposed end walls 22, 24, upstanding side walls 26, 28, a closed bottom wall 30 and an open top 32. The sound producing means 10 also includes a power drum means 34 having a first hub 36, and flanges or discs 38, 40 and an intermediate flange or disc 42. The power drum means 34 also has a second hub 44 and a small-diameter end flange 46. The power drum means 34 is rotatably mounted on a shaft 48 having one end 50 seated in an aperture 52 provided in the side wall 28 and another end 54 seated in a hollow boss 56 formed on a housing 58 of a governor means 60. The housing 58 is supported from the bottom wall 30 by a flange 62 and extends into a recess 64 provided in the power drum means 34. Disposing a portion of the housing 58 in the recess 64 is an important feature of the present invention because it minimizes the space required in the housing 20 for the governor means 60 making the sound producing means 10 compact. The power drum means 34 is maintained in spaced relation with the side wall 28 by a spacer 66 mounted on the end 50 of shaft 48 between the flange 46 and the side wall 28.

The sound producing means 10 also includes a take-up drum means 68 having a first large-diameter hub portion 70, first end flanges 72, 74, a first small-diameter hub portion 76, a second small-diameter hub portion 78 and a first small-diameter end flange 80. The take-up drum means 68 also has a second large-diameter hub portion 82 rotatably mounted on the second small-diameter hub 78 and an intermediate flange 84. The take-up drum means 68 is rotatably mounted on a shaft 86 having a first end 88 seated in an aperture 90 provided in the side wall 28 and a second end 92 seated in an aperture 94 provided in a partition 96 supported by the bottom wall 30. The take-up drum means 68 is maintained in spaced relation with the side wall 28 by a spacer 98 mounted on shaft 86 between the flange 80 and the side wall 28.

The sound producing means 10 also includes a constant-force spring means 100 normally biased to wind itself on the take-up drum means 68 having an end 102 affixed to the second large-diameter drum 82. The spring means 100 includes another end 104 affixed to the hub 36 of power drum means 34 in operative association therewith. The spring means 100 is adapted to be wound on the power drum means 34 against the normal bias in the spring means 100 for storing energy by pulling a drawstring 106 having an end 108 affixed to the hub 44 and an end 110 extending through an eyelet 112 provided in the end wall 22. A pull-ring 114 is affixed to the end 110 and may be gripped by a user of the sound producing means 10 to rotate the power-drum means 34 in a clockwise direction, as viewed in FIG. 3, by unwinding the drawstring 106 from the hub 44. This transfers the spring means 100 from the take-up drum means 68 to the power-drum means 34 against the normal bias in the spring means 100 for storing energy therein. When the drawstring 106 is released, this stored energy rotates the power-drum means 34 for transferring a recorded-message carrier means 116 from the take-up drum means 68 to the power-drum means 34.

Figure 6:
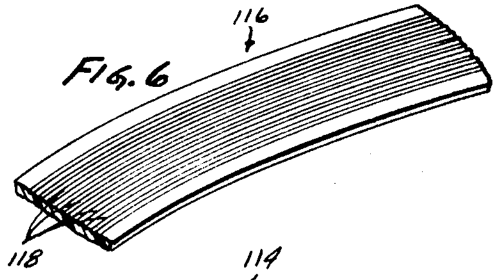
FIG. 6 is an enlarged, partial perspective view of a section of the message-carrier means employed in the sound producing means of FIG. 1.
Figure 2:
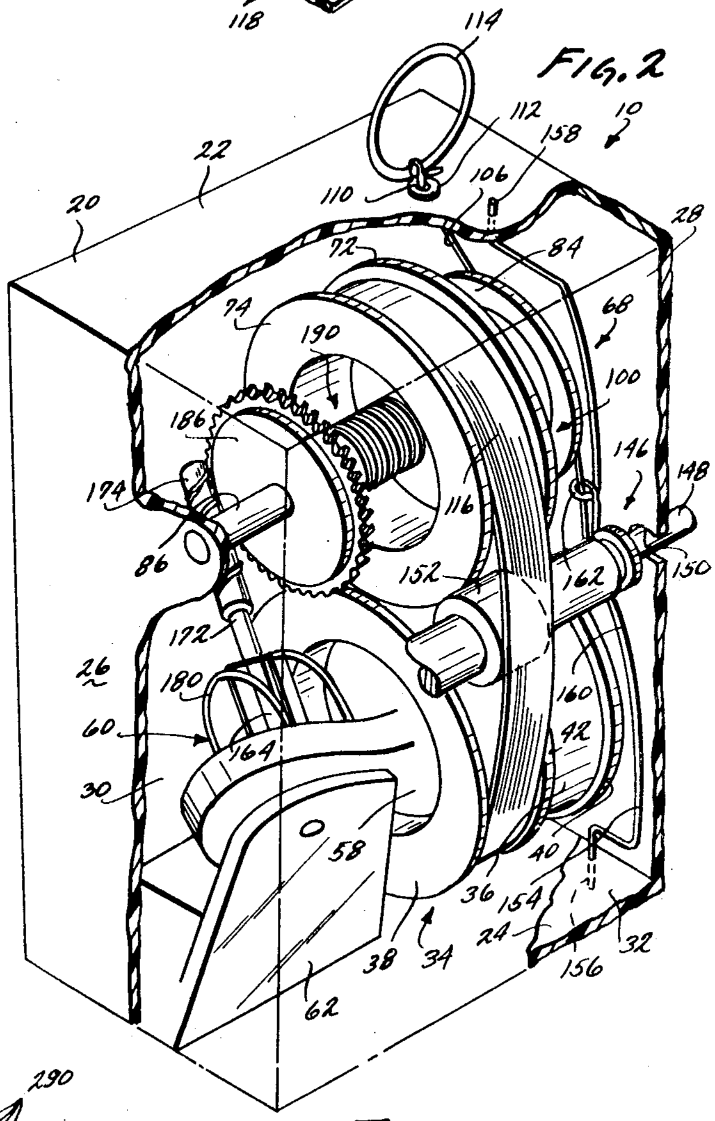
FIG. 2 is an enlarged, partial perspective view, with parts broken away to show internal construction, of the sound reproducing means of FIG. 1.
Figure 7:
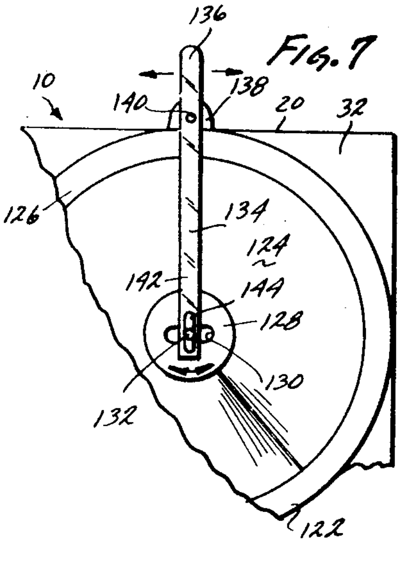
FIG. 7 is a partial, plan view of the device shown in FIG. 3.
Figure 8:
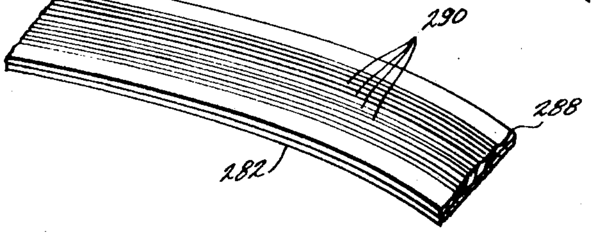
FIG. 8 is an enlarged, partial perspective view of a section of a unitary message-carrier and spring means employed in a sound producing means constituting a second embodiment of the invention and shown in FIGS. 9–11.
Figure 3:
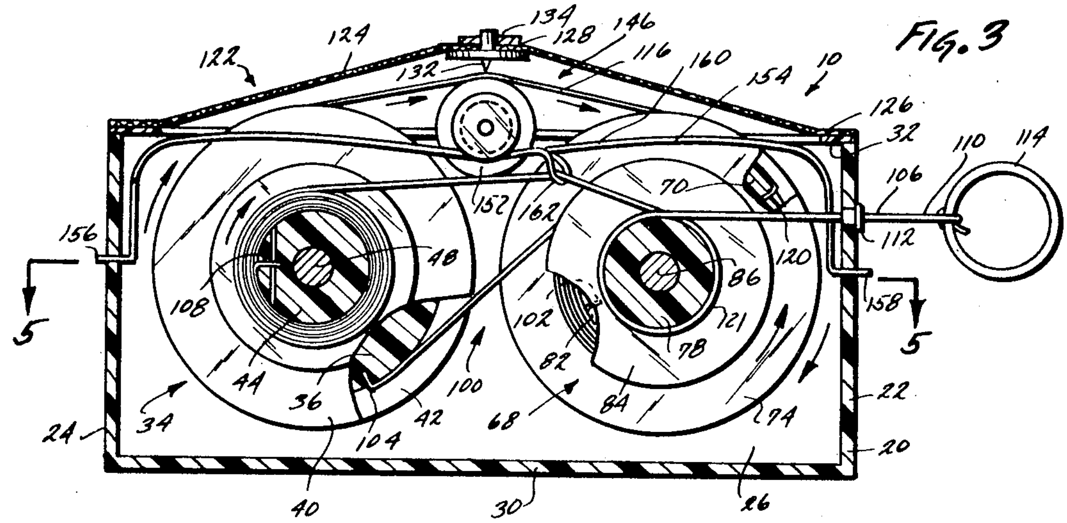
FIG. 3 is an enlarged, cross-sectional view of the sound producing means of FIG. 1 showing the relative location of the various parts thereof during one phase of operation.
Figures 4, 5:
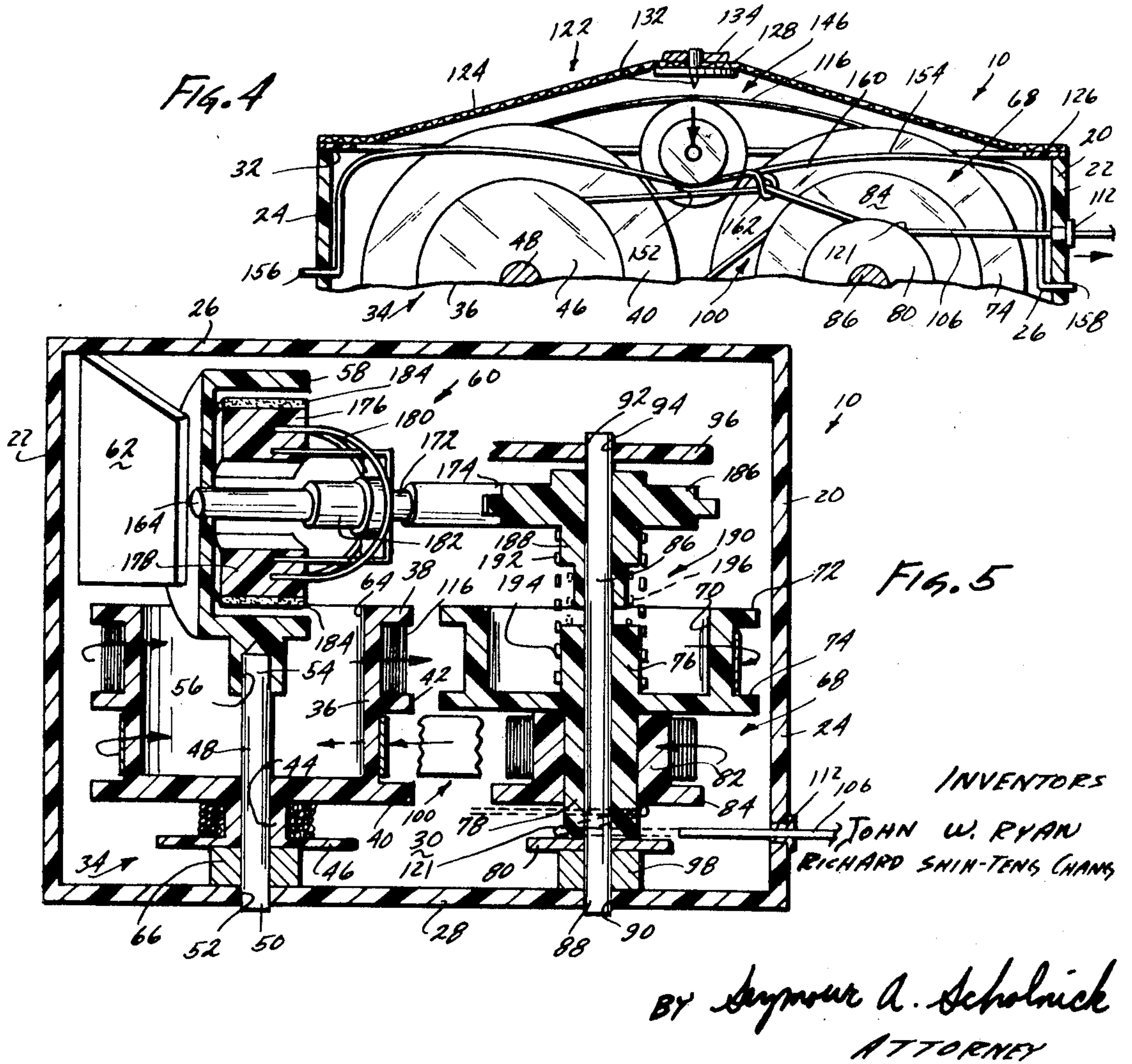
FIG. 4 is a partial view similar to FIG. 3 showing the relative location of the parts during another phase of the operation of the device.
FIG. 5 is a cross-sectional view taken along line 5—5 of FIG. 3.

The recorded-message carrier means 116 may comprise an elongated strip of a plastic material upon which suitable sounds are recorded. As shown in FIG. 6, the recorded-message carrier means 116 may be provided with a plurality of mechanically-recorded sound tracks 118 which may extend the full length of the recorded-message carrier means 116 and is normally wound on the power-drum means 34 and includes an end 120 affixed to the first large-diameter hub portion 70 on the take-up drum means 68. The carrier means 116 may be transferred to the take-up drum means 68 by pulling the drawstring 106 tensioning a looped portion 121 into tight frictional engagement with the second small-diameter hub portion 78 for imparting rotation thereto. Thus, when the drawstring 106 is pulled to transfer the spring means 100 to the power drum means 34, the carrier means 116 is simultaneously transferred from the power drum means 34 to the take-up drum means 68. The rotation imparted to the power-drum means 34 by the spring means 100 upon release of the drawstring 106 then transfers the carrier means 116 from the take-up drum means 68 to the power-drum means 34. During this transfer operation, the sounds recorded on the carrier means 116 may be reproduced by a sound-reproducing means 122 affixed to the housing 20 adjacent the open top 32 in operative association with the carrier means 116.

The sound-reproducing means 122 includes a speaker cone 124 having a corrugated edge portion 126 affixed to the housing 20 and an apex portion 128. The apex portion 128 is provided with an arcuate slot 130 in which a phonograph needle 132 is mounted for tracing the sound tracks 118. The needle 132 may be shifted from one sound track to another by a lever means 134 (FIG. 7) having one end 136 pivotally connected to a bracket 138 on the housing 20 by a pivot pin 140 and another end 142 provided with a slot 144 holding the needle 132 captive. The carrier means 116 is pressed into operative engagement with the needle 132 by a mandrel means 146 having one end (not shown) journalled in the side wall 26 and another end 148 journalled in a U-shaped opening 150 provided in the side wall 28. The mandrel means 146 includes a roller 152 adapted to be urged into engagement with the carrier means 116 by a spring means 154 having a first end 156 connected to the end wall 24 and a second end 158 connected to the end wall 22. The spring means 154 includes an upwardly-bowed mid portion 160 urging the end 148 of mandrel means 146 upwardly in the U-shaped opening 150. The spring means 154 also includes a looped portion 162 forming an eyelet about the drawstring 106 so that tensioning of the drawstring 106 lowers the bowed portion 160 to the position shown in FIG. 4 for bringing the carrier means 116 out of engagement with the needle 132 during transfer of the carrier means 116 from the power-drum means 34 to the take-up drum means 68.

The rate of travel of the carrier means 116 is controlled by the governor means 60 which includes a spindle 164 having an end journalled in an aperture provided in the end wall of housing 58 and an end 172 which carries a worm gear 174 for imparting rotation to the spindle 164. The governor means 60 also includes a pair of weights 176, 178 connected to the spindle 164 by U-shaped spring means 180 and a hub 182. Each weight 176, 178 carries a felt pad 184 adapted to be urged into engagement with the housing 58 against the restraining force of spring 180 when the spindle 164 reaches a predetermined operating speed. The worm gear 174 is driven by a gear 186 which is rotatably mounted on the shaft 86. The gear 186 includes a hub 188 which is connected to the first small-diameter hub portion 76 by a spring clutch means 190 having a first end 192 connected to the hub 188 and a second end 194 connected to the hub portion 76. A reduced-diameter, intermediate portion 196 of hub 188 allows the spring clutch means 190 to wind inwards slightly when torque is applied to hub 76. The clutch means 190 not only performs a clutching function between the take-up drum means 68 and the gear 186, but also comprises a compliant coupling therebetween for minimizing the transfer of vibrations from the gears 174 and 186 to the carrier means 116. The clutch means 190 comprises a helical spring which loosens its grip on the hubs 76 and 188 during rotation of the large-diameter hub 70 by the drawstring 106 in one direction and firmly grips the hubs 76 and 188 to rotate the governor means 160 at high speed when the hub 70 is rotated in the other direction by the power-drum means 34 winding the carrier means 116 thereupon.

In use, a child user of the toy 12 may grasp the ring 114 and pull the drawstring 106 to transfer the spring means 100 from the take-up drum means 68 to the power-drum means 34 and simultaneously transfer the carrier means 116 from the power-drum means 34 to the take-up drum means 68. During this operation, the looped portion 121 of the drawstring 106 will rotate the first small-diameter hub 76 in such a direction that the end 194 of clutch means 190 will not grip the hub 76 with sufficient force to rotate the gear 186. After the drawstring 106 has been pulled to the end of its travel, it may be released whereupon the energy stored in spring means 100 on the power-drum means 34 will impart rotation thereto pulling the carrier means 116 from the take-up drum means 68 and winding it upon power-drum means 34. This rotates the hub 76 in such a direction that the end 194 of clutch means 190 is brought into firm engagement with hub 76 for imparting rotation to the gear 186 which, in turn, rotates the worm gear 174 at high speed brining the governor means 60 into play for controlling the rate of travel of the carrier means 116. As the carrier means 116 travels fom the take-up drum means 68 to the power-drum means 34, the needle 132 traces the sound track 118 selected by swinging the lever 134 for transmitting vibrations from the sound track 118 to the speaker cone 124.

Referring now to FIGS. 8–12, a sound-producing means constituting a second embodiment of the present invention, generally designated 200, may be attached to the bracket 18 in the toy 12 in place of the sound producing means 10 and includes a housing 202 having end walls 204, 206, side walls 208, 210, a bottom wall 212 and an open top 214.

A power-drum means 216 is rotatably mounted in the housing 202 on a shaft 218 having an end 220 rotatably mounted in a slot 219 provided in the side wall 210 and a second end 222 journalled in the side wall 208. The power-drum means 216 is spaced from the side walls 210 and 208 by spacer means 224 and 226, respectively, and includes a large-diameter hub 228, a small-diameter hub 230 and associated flanges 232, 234 and 236.

The sound producing means 200 also includes a take-up drum means 238 which is rotatably mounted in the housing 202 by a shaft 242 having a first end 243 journalled in the side wall 210 and a second end 244 journalled in the sidewall 208. The take-up drum means 238 includes a hub 248 and associated end flanges 250 and 252.

The sound producing means 200 also includes a governor means 254 having a spindle 255 rotatably mounted in the housing 202 with a first end 256 journalled in the side wall 210 and a second end 258 journalled in a wall 260 of a governor housing 262 formed on the sidewall 208. The governor means 254 includes a pinion gear 263 and a cross arm 264 which may be formed integrally with the spindle 255. The pinion gear 263 drivingly engages a ring gear 265, formed on the flange 234 of drum means 216, for rotation thereby. The governor means 254 also includes a pair of weights 266, 268 which are swingably connected to the ends 270, 272, respectively, of arm 264 by pins 274. The weights 266, 268 are biased toward the spindle 255 by associated spring means 276 and are provided with felt pads 278 adapted to engage the inner wall 280 of housing 262 when subjected to sufficient centrifugal force upon rotation of the arm 264 by drum 216 through gears 265 and 263 and spindle 255. The drum 216 is rotated by the force stored in a constant-force spring means 282. The spring means 282 is normally biased to wind itself on the take-up drum means 238 and may be transferred from drum means 238 to drum means 216 by a drawstring 284 which is normally wound about the hub 230.

The sound producing means 200 also includes a recorded-message carrier means 288 which is shown for purposes of illustration, but not of limitation, as comprising a suitable plastic member bonded to the spring means 282. The carrier means 288 is provided with a plurality of recorded sound grooves or tracks 290 operatively associated with a sound-reproducing means 292 including a needle 294 mounted in the apex portion 296 of a speaker cone 298. When the drawstring 284 is pulled in the direction of arrow 300, the drawstring 284 moves the end 220 of shaft 218 downwardly in the slotted aperture 219 lowering the carrier means 288 out of engagement with the needle 294. The needle 294 includes a carrier 304 having an annular shoulder 304 engaged under the apex 296 of cone 298 and an upstanding pin 305 extending through a slotted aperture 306 provided in the apex 296 for permitting limited lateral movement of needle 294 with respect to the grooves 290.

Unwanted vibrations between the governor weights 266, 268 and carrier means 288 may be minimized by making the arm 264 in the form of a compliant coupling.

Figure 13:
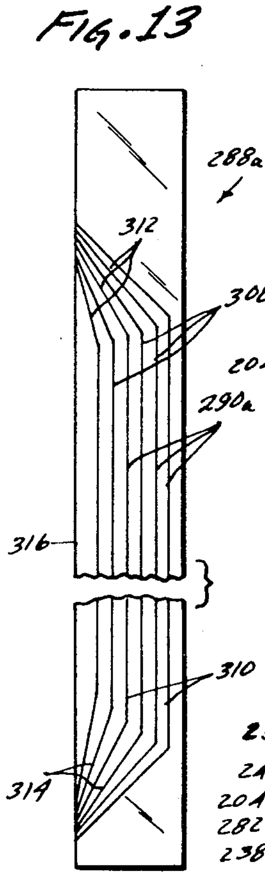
FIG. 13 is an enlarged, partial plan view of a modified message-carrier means which may be employed in the sound producing means of FIG. 9.
Figure 9:
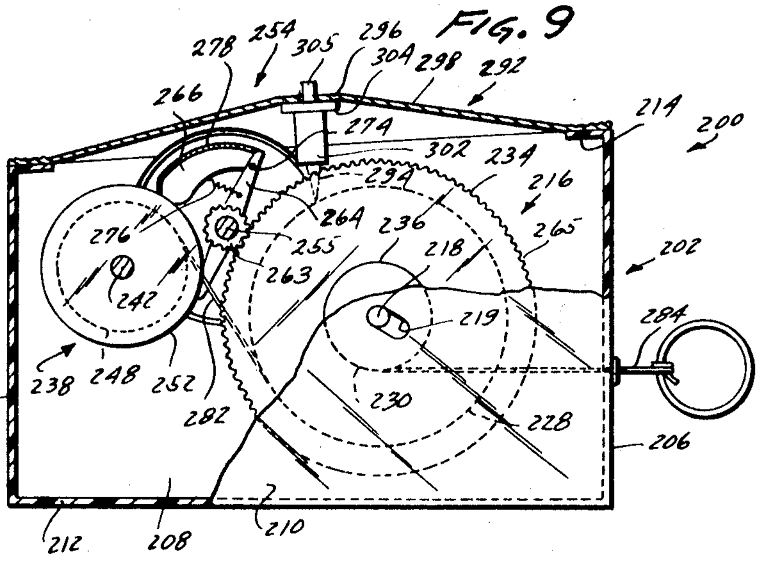
FIG. 9 is an elevational view, with parts broken away to show internal construction, of a second embodiment of a sound producing means of the present invention.
Figure 10:
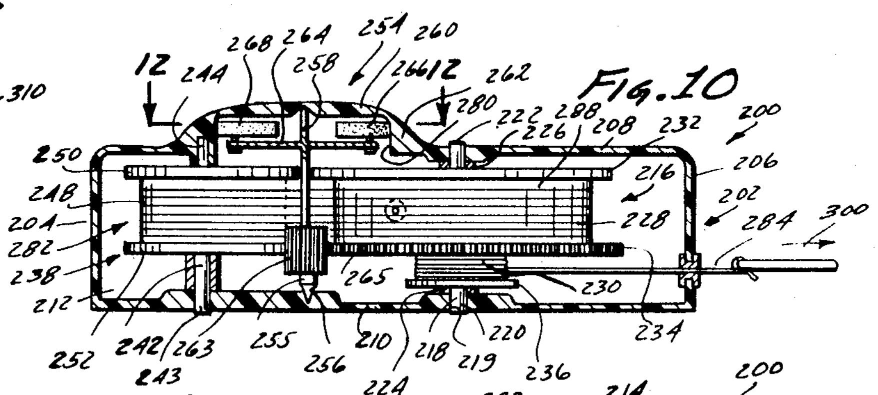
FIG. 10 is a horizontal cross-sectional view of the device of FIG. 9.
Figure 11:
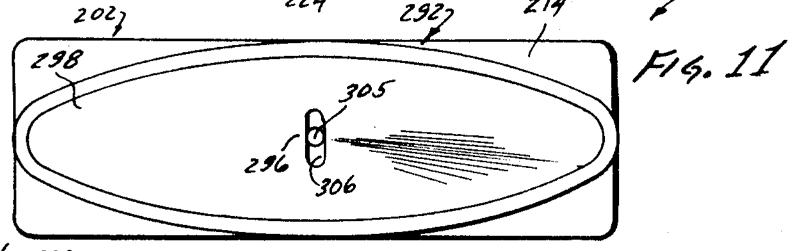
FIG. 11 is a plan view of the device of FIG. 9.
Figure 12:
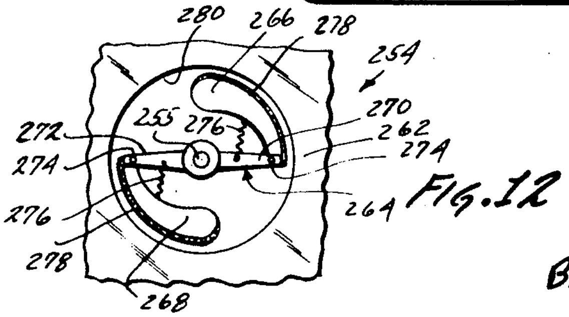
FIG. 12 is a partial cross-sectional view taken along line 12—12 of FIG. 10.

Referring now to FIG. 13, a modified recorded-message carrier means **288*a* may be identical to the carrier means 288 except that the leading ends 308 and the trailing ends 310 of a plurality of sound tracks 290*a* are connected by lead-in grooves 312 and lead-out grooves 314, respectively, to an edge 316 of carrier means 288*a*. The lead-out grooves 314 move the needle 294 laterally in aperture 306 to a position superjacent the edge 316. The lead-in grooves 312 will then be selected randomly for moving the needle 294 onto a particular sound track 290*a*, depending on the exact point of engagement of the needle 294 with carrier means 288*a* when the drawstring 284 is released after transferring spring means 282 onto drum means 216**.

While the particular sound producing means herein shown and described in detail are fully capable of attaining the objects and providing the advantages hereinbefore stated, it is to be understood that they are merely illustrative of the presently preferred embodiments of the invention and that no limitations are intended to the details of construction or design herein shown.

We claim:

1. A compact phonograph device comprising: an elongated carrier having a plurality of sound track grooves established thereon and extending longitudinally thereof substantially parallel to the longitudinal edges thereof, each of said grooves having a lead-in portion at one end thereof; all of said lead-in portions extending in angular relation to its sound track groove toward the same one edge of said carrier so that in a predetermined region of said carrier all of said lead-in portions are longitudinally spaced; a phonograph needle normally engageable with said carrier for reproducing sounds recorded in said grooves; first means operable for longitudinally moving said carrier relative to said needle alternately in a first playing direction and in a second opposite return direction; second means operable while said carrier is moving in said return direction for relatively separating said needle and carrier; third means operable while said carrier is moving in said playing direction for reengaging said needle with said carrier in said predetermined region of said carrier, whereby said needle engages an individual lead-in groove corresponding to the longitudinal position of said tape relative to said needle at the time of the engagement of said needle with said tape, and further means on said carrier for moving said needle to said one edge after completing reproduction of sound from any of said sound track grooves.

2. A device as defined in claim 1 wherein said further means includes a plurality of sound track groove lead-out portions connected on said carrier means to said sound track grooves, each of said sound track grooves having a corresponding one of said lead-out portions connected to its opposite end, all of said lead-out portions extending toward said same one edge of said carrier means.

3. A device as defined in claim 2 wherein said needle is freely movable laterally of said carrier means whereby said lead-out portions position said needle adjacent said one edge to be again reengaged with said carrier means in any one of said lead-in portions.

References Cited

UNITED STATES PATENTS

| | | | |
|---|---|---|---|
| 3,370,855 | 2/1968 | Lindsay | 274—11 |
| 3,389,915 | 6/1968 | Owen et al. | 274—11 |
| 3,410,564 | 11/1968 | Duncan et al. | 274—11 |

FOREIGN PATENTS

| | | |
|---|---|---|
| 314,938 | 1929 | Great Britain. |

LEONARD FORMAN, Primary Examiner

D. A. DEARING, Assistant Examiner

U.S. Cl. X.R.

274—11